United States Patent [19]
Golderer et al.

[11] Patent Number: 5,974,898
[45] Date of Patent: Nov. 2, 1999

[54] FORCE SENSOR HAVING TEST DEFLECTION DEVICE

[75] Inventors: Wolfgang Golderer, Niefern-Oeschelbronn; Andreas Reppich, Leonberg; Manfred Moser, Reutlingen-Sickenhausen; Annette Seibold, Rutesheim; Reiner Schuetz, Ditzingen, all of Germany

[73] Assignee: Robert Bosch GmbH, Stuttgart, Germany

[21] Appl. No.: 08/782,915

[22] Filed: Jan. 13, 1997

[30] Foreign Application Priority Data

Jan. 13, 1996 [DE] Germany ............... 196 01 078

[51] Int. Cl.[6] ................................................. G01D 7/00
[52] U.S. Cl. ............................................. 73/862.043
[58] Field of Search .................... 73/1 R, 1 B, 1 D, 73/4 R, 862.043, 862.626, 862.628

[56] References Cited

U.S. PATENT DOCUMENTS

| | | | |
|---|---|---|---|
| 5,060,504 | 10/1991 | White et al. | 73/1 D |
| 5,253,510 | 10/1993 | Allen et al. | 73/1 D |
| 5,377,524 | 1/1995 | Wise et al. | 73/4 R |
| 5,391,283 | 2/1995 | Shimoda et al. | 73/1 |
| 5,492,020 | 2/1996 | Okada | 73/1 D |

*Primary Examiner*—Benjamin R. Fuller
*Assistant Examiner*—Jewel V. Thompson
*Attorney, Agent, or Firm*—Venable; George H. Spencer; Norman N. Kunitz

[57] ABSTRACT

A force sensor has a measuring diaphragm adapted to undergo a deflection in response to a force being applied thereto. The force sensor further has a test deflection device operatively coupled to the measuring diaphragm for effecting a test deflection thereof independently of any force external to the force sensor being applied to the measuring diaphragm.

12 Claims, 2 Drawing Sheets

FORCE SENSOR HAVING TEST
DEFLECTION DEVICE

CROSS REFERENCE TO RELATED APPLICATION

This application claims the priority of German Application No. 196 01 078.0-52 filed Jan. 13, 1996, which is incorporated herein by reference.

BACKGROUND OF THE INVENTION

The invention relates to a force sensor, and especially to a compressive force sensor, such as a pressure sensor.

It is known in the art to produce conventional compressive force sensors according to a so-called ceramic multi-layer technique disclosed in DE 44 41 487.0. The technique involves applying a number of pastes, or "green films", to a substrate, and bonding the pastes to the substrate by a firing process, such as sintering. In order to carry out the above process, the layers are arranged such that they define at least one diaphragm extending over a recess in the sensor. As a result of the above configuration, a force applied to the diaphragm, for example, a pressure force external to the sensor, causes a deflection of the diaphragm which is proportional thereto. In the process disclosed in DE 44 41 487.0, diaphragms such as the one described above may be produced which are both largely stress-free and crack-free.

Furthermore, it is known in the prior art to integrate passive and/or active electronic components into force sensors such as the one described above. These electronic components supply a measuring signal which is proportional to a deflection of the diaphragm in response to a force being applied thereto from the exterior of the sensor, that is, in response to an external force. For the above purpose, piezoresistive resistors may be used which change their resistance value as a result of the deflection of the diaphragm. Alternatively, capacitive devices are known which change their capacitance likewise as a function of the deflection of the diaphragm. The measuring signals resulting from the deflection of the diaphragm are fed to an evaluating circuit, which in turn generates a signal analog to the external force and/or triggers a reaction, as is well known.

A disadvantage of the force sensors according to the prior art is that they are subject to an ageing process during the course of their intended use, which ageing process affects their reliability. The prior art does present measures for subjecting a conventional force sensor, at selectable intervals, to a functional test. According to the above functional test, a check is performed as to whether the force sensor being tested generates a sensor signal in response to an external force being applied thereto. However, one disadvantage of the above is that possible changes in the sensor signal resulting from an ageing of the force sensor are not accounted for.

SUMMARY OF THE INVENTION

It is an object of the invention to overcome the disadvantages associated with prior art force sensors by providing a force sensor which, regardless of its age, allows the user to perform a precise functional check of the measuring diaphragm thereof.

The above object, together with other objects to become apparent as the description progresses, are accomplished according to the invention by the provision of a force sensor having a measuring diaphragm adapted to undergo a deflection in response to a force being applied thereto; and a test deflection device operatively coupled to the measuring diaphragm for effecting a test deflection thereof independently of any force external to the force sensor being applied to the measuring diaphragm.

The above configuration of the force sensor according to the invention has the advantage that it allows a comparison of a sensor signal resulting from the actual test deflection of the measuring diaphragm with an expected signal based on a test force being applied to the diaphragm for effecting the test deflection. A deviation between the sensor signal and the expected signal indicates an ageing of the force sensor, reflected, for example, in a change in the elasticity of the measuring diaphragm. By detecting and recording a deviation signal based on the deviation or offset mentioned above, a measuring signal later supplied by the force sensor can be adjusted accordingly, so that measuring errors resulting from changes in the measuring diaphrapm can be corrected.

According to one embodiment of the invention, the test deflection device may advantageously be a piezoelectric actuator having a known voltage-force characteristic. The piezoelectric actuator may be in the form of a tape diaphragm, and may further be made a part of the measuring diaphragm. Advantageously, by applying a known voltage to the piezoelectric actuator, one is able to easily determine the force resulting therefrom, that is, the force applied by the actuator to the measuring diaphragm as the testing force for effecting a test deflection thereof.

According to another embodiment of the invention, the measuring diaphragm and the test deflection device are both integrated into the sensor body. Alternatively, he test deflection device may be structurally integrated into the measuring diaphragm. The above configurations of the force sensor have the advantage that they simplify a testing of the sensor at selectable time intervals between two planned measurements during the operation of the force sensor. Thus, a direct error analysis of the force sensor may be realized without much complexity and according to an automated sequence.

According to one embodiment of the invention, the test deflection device is disposed on a side of the measuring diaphragm facing away from a location on the sensor for the application of the force to be sensed.

According to another embodiment of the invention, the sensor may comprise either a capacitive device or a piezoelectric sensor operatively coupled to the measuring diaphragm for sensing a deflection thereof in response to a force being applied thereto.

According to a further embodiment of the invention, the force sensor include a plurality of measuring diaphragms and a plurality of test deflection devices each of which is operatively coupled to a corresponding one of the plurality of measuring diaphragms.

According to yet another embodiment of the invention, the force sensor further includes a substrate connected to the measuring diaphragm, the test deflection device being disposed on the substrate.

According to a further embodiment of the invention, the sensor body defines a recess therein adapted to undergo a size change in response to a force being applied to the sensor body; and a test deflection device operatively coupled to the sensor body effects a test size change of the recess independently of any force external to the force sensor being applied to the sensor body during a test check of the force sensor.

BRIEF DESCRIPTION OF THE DRAWINGS

The foregoing objects of the invention, together with other objects and advantages which may be attained by its use, will become more apparent upon reading the following detailed description of the invention taken in conjunction with the drawings. In the drawings, where like reference numerals identify corresponding components.

DETAILED DESCRIPTION OF THE INVENTION

FIGS. 1–4 show the general features of a force sensor 10 according to the invention. It is to be understood, however, that force sensor 10 may comprise any particular force sensor, such as, for example, an acceleration sensor, a pressure sensor, such as one for sensing the pressure certain media, for instance, brake fluid in a motor vehicle, or any other sensor effective for detecting an force external to the sensor.

Figure 1:
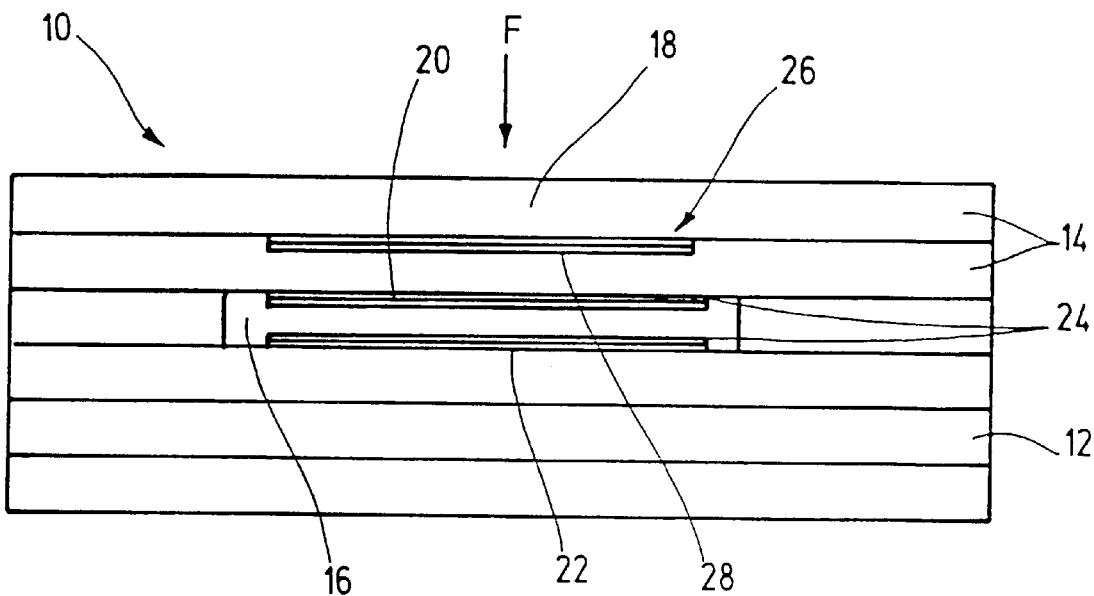
FIG. 1 is a schematic cross-sectional view of a force sensor according to a first embodiment of the invention.

Referring now to FIG. 1, force sensor 10 has a multilayer design such as those known in the art. The multilayer design may be implemented, for example, according to DE 44 41 487.0. Force sensor 10 includes a substrate 12 which supports a layer 14 thereon. Layer 14 may include one layer, or, as shown in FIG. 1, two partial layers both indicated by the reference numeral 14. Layer 14 bridges a recess 16 at one region thereof, thus forming a measuring diaphragm 18 over the recess. Recess 16 may be formed, for example, between layer 14 and a corresponding profile in an associated layer supported by substrate 12, such as a layer having a hollow on at least one side thereof. On its side facing recess 16, measuring diaphragm 18 supports a first electrode 20. A second electrode 22 is disposed opposite first electrode 20 at the bottom of recess 16. A test deflection device 26, which, in the embodiment shown in FIG. 1, is an actuator in the form of a piezoelectric actuator 28, is arranged within the diaphragm so as to be structurally integral therewith. Actuator 28 and electrodes 20 and 22 are electrically coupled to a circuit arrangement (not shown).

The operation of the force sensor according to FIG. 1 will now be described.

During operation of the force sensor 10, a force F acts upon the measuring diaphragm 18 as shown. In FIG. 1, as well as in all of the other figures, force F is shown as acting in a direction toward recess 16. However, as is well known, force F may have a direction away from recess 16. Force F results in a deflection of measuring diaphragm 18, either in a direction toward or in a direct counter to recess 16. Depending on the deflection sensitivity of the measuring diaphragm, such as its elasticity, a specific deflection of the diaphragm takes place as a result of the application of a force of a specific magnitude thereto. The deflection of diaphragm 18 causes a distance between electrodes 20 and 22 of a capacitive evaluating means 24 to change. As a result of the above, the magnitude of the force being applied to the diaphragm can be determined according to known methods from a change in the capacitance of the capacitive evaluating means if the elasticity of the diaphragm is known. However, by virtue of the natural effects of ageing, diaphragm 18 is subject to change in its elasticity. Therefore, the action of an identical force F at a much later time may result in a different deflection of the diaphragm and thus in a different change in the capacitance of the capacitive evaluating means 24. As a result, a force magnitude determined on the basis of an obsolete elasticity of the diaphragm would invariably lead to an erroneous sensor signal.

According to the invention, piezoelectric actuator 28, by virtue of having a known voltage-force characteristic, can be used to apply a test force of a defined magnitude to diaphragm 18 by virtue of the application of a defined voltage thereto. On the basis of an available elasticity value for the measuring diaphragm, a sensor signal is generated by the force sensor from a change in the distance between electrodes 20 and 22. If the available, or existing, elasticity value in the force sensor is different from the actual elasticity of diaphragm 18, there will be a deviation between a test force signal based on the test force and the sensor signal. The deviation is a measure of the change in elasticity between an initial state of the measuring diaphragm and its changed state brought about by ageing. The deviation may be detected and stored in a corresponding circuit arrangement which allows an adjustment of subsequent sensor signals measured by the force sensor based on the deviation. The above configuration of the invention allows the determination of measurement errors in the force sensor stemming from defects in the measuring diaphragm.

Moreover, depending on the field of application of the force sensor 10, that is, depending on the purpose for which the force sensor is used (i.e. whether it is used for sensing pressure, acceleration or another type of force), the force sensor may further include a threshold device which signals a need to replace the sensor should a threshold deviation value be exceeded during a test check.

The above configuration of the invention allows a direct error analysis of measuring diaphragm 18 by means of actuator 28 which may be structurally integrated into force sensor 10 as shown in FIG. 1. The structural integration of a piezoelectric device such as actuator 28 into force sensor 10 may be implemented according to conventional manufacturing techniques. In particular, the structural patterning and fabrication of force sensor 10 may be combined with the structural integration of actuator 28 therein, thus rendering additional complex process steps unnecessary.

According to one aspect of the invention, actuator 28 can be activated at regular intervals for subjecting the measuring diaphragm 18 to intermittent test checks such as the test check described above. For example, actuator 28 may be activated between regularly occurring measurements by the force sensor according to an automated sequence.

Figure 2:
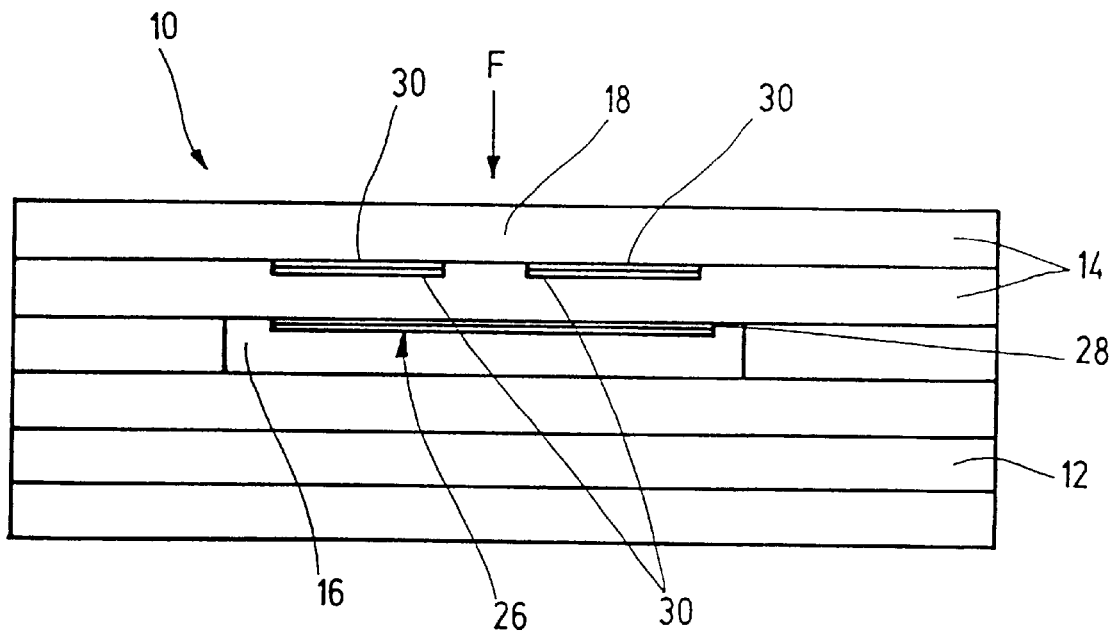
FIG. 2 is a view similar to FIG. 1 showing a second embodiment of the invention.

Referring now to FIG. 2, a further force sensor 10 according to the invention is illustrated. Parts in the force sensor shown in FIG. 2 which are identical to those shown in FIG. 1 have identical reference numerals and are not described further.

Force sensor 10 shown in FIG. 2 is a piezoresistive sensor, and includes piezoresistive resistors 30 arranged in the measuring diaphragm, resistors 30 together forming a deflection evaluating arrangement 32. In the embodiment of FIG. 2, test deflection device 26 comprises piezoelectric actuator 28 arranged on the side of diaphragm 18 facing recess 16.

The force sensor shown in FIG. 2 operates similarly to the one shown in FIG. 1, except that, instead of the deflection of the diaphragm being sensed by a capacitive evaluating means 24, the deflection is sensed by the resistors 30. Specifically, a deflection of diaphragm 18 results In a tensile and/or compressive stress on resistors 30, which causes the generation of a voltage corresponding to the deflection of the measuring diaphragm. The generated voltage may be detected and processed into a sensor signal by a known circuit arrangement (not shown). A test check of measuring diaphragm 18 is effected in the same way as explained above with respect to the embodiment of FIG. 1, the resulting force sensor further having the same advantages as set forth with respect to FIG. 1.

Figure 3:
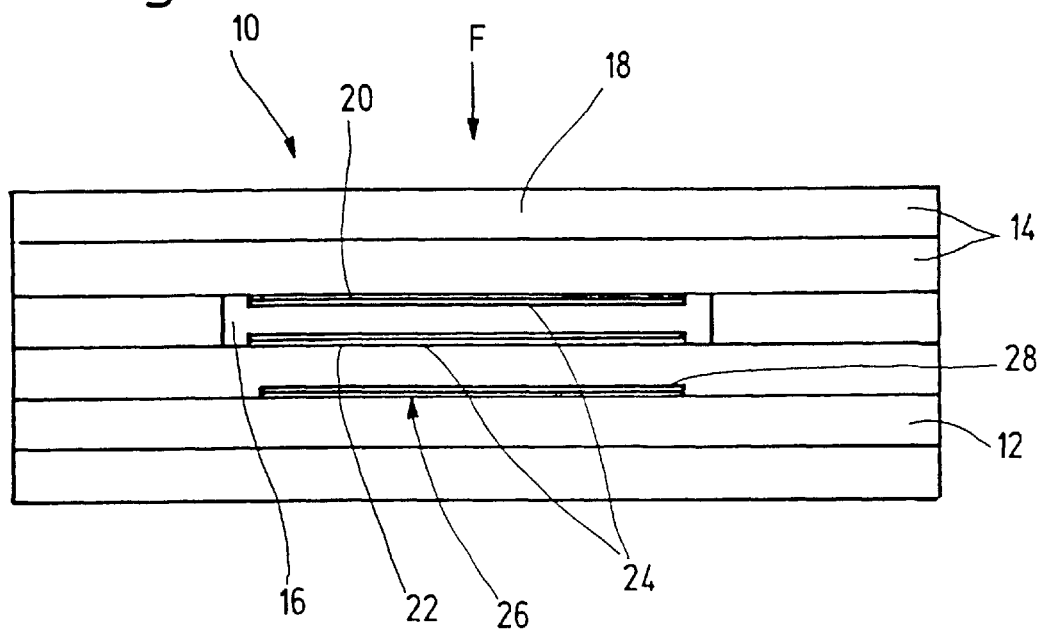
FIG. 3 is a view similar to FIG. 1 showing a third embodiment of the invention.

Referring now to FIG. 3, a further force sensor 10 according to the invention is illustrated. In FIG. 3, similarly to FIG. 1, parts in the force sensor shown in FIG. 1 which are identical to those shown in FIG. 1 have identical reference numerals and are not described further.

The force sensor 10 in FIG. 3, similarly to the one shown in FIG. 1, is a capacitive sensor including a capacitive measuring means 24. However, in the embodiment of FIG. 3, test deflection device 26 is not arranged in the measuring diaphragm, but in another part of the sensor body, and, specifically, in substrate 12 below recess 16. Thus, the embodiment of FIG. 3 relates in general to a force sensor having a sensor body defining a recess therein. The sensor body in FIG. 3 is composed of the multilayered structure including substrate 12 and layer 14. The recess, as is known, undergoes a size change in response to a force being applied to the sensor body, such as force F acting from a region external to the sensor body, or such as a test force being applied by test deflection device 26. Test deflection device 26, similarly to the one shown in FIGS. 1 and 2, may thus comprise a piezoelectric actuator 28 for causing a deflection of electrode 22 based on a build-up of a predetermined test force in substrate 12 during a test check of the force sensor. Thus, actuator 28 effects a test size change of the recess which leads to a corresponding sensor signal, thereby allowing a function control of force sensor 10 in a manner similar to that explained in relation to FIGS. 1 and 2 above. The above arrangement of actuator 28, however, does not allow the advantageous option of determining a change in the elasticity of measuring diaphragm 18 in addition to the functional control being effects. However, the arrangement of actuator 28 in the substrate 12 advantageously allows a disposition of the test deflection device such that it is protected vis-a-vis extraneous external forces which may tend to affect force F.

Figure 4:
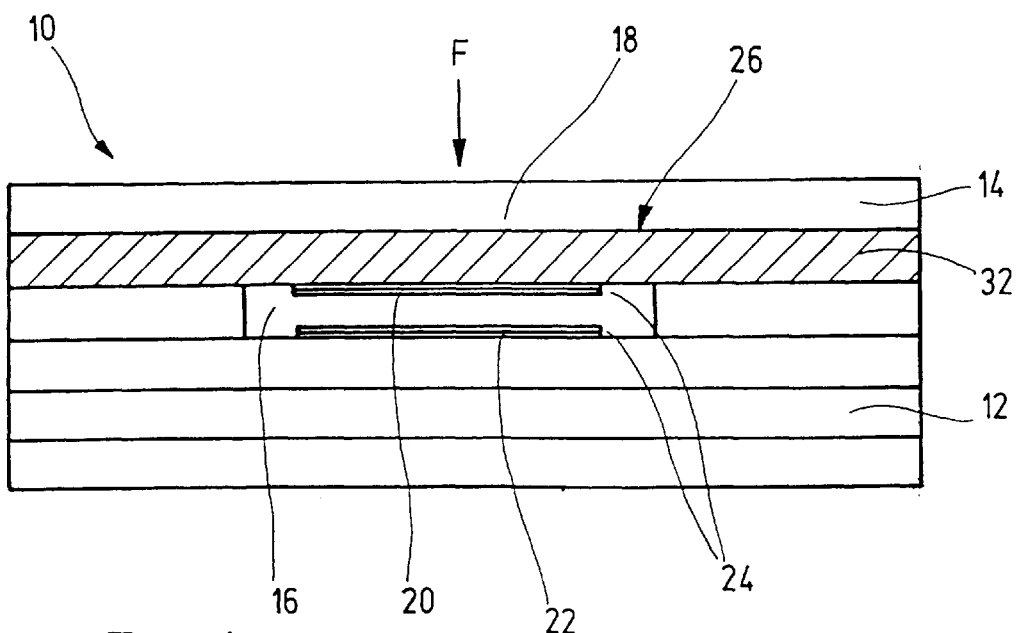
FIG. 4 is a view similar to FIG. 1 showing a fourth embodiment of the invention.

Referring now to FIG. 4, a further force sensor 10 according to the invention is illustrated. In FIG. 4, similarly to FIG. 1, parts in the force sensor shown in FIG. 1 which are identical to those shown in FIG. 1 have identical reference numerals and are not described further.

In FIG. 4, test deflection device 26 is structurally integrated into the force sensor 10 and comprises a piezoelectric tape diaphragm 32 which is a component part of diaphragm 18 bridging recess 16. Tape diaphragm 32 has a defined voltage-force characteristic and functions much in the same manner as piezoelectric actuator 28 in the embodiments of FIGS. 1 and 2. The structural integration of tape diaphragm 32 into the measuring diaphragm itself results in advantages in terms of fabrication engineering, especially if tape diaphragm 32 is intended to simultaneously bridge several force sensors 10 of a substrate 12.

The embodiments of FIGS. 1–4 each illustrate a force sensor 10 which has a single measuring diaphragm. Of course, it is possible to design a form-sensor 10 having several measuring diaphragms 18. In the event of the above, force sensor 10 includes a corresponding number of recesses 16 over which an associated measuring diaphragm 18 is formed. Each of the measuring diaphragms 18 or of the recesses 16 includes a test deflection device 26 so that each measuring diaphragm 18 can be tested individually and can be readjusted if a deviation occurs as a result of a change in the sensor, and especially of a change in the elasticity of the measuring diaphragm.

It will be understood that the above description of the present invention is susceptible to various modifications, changes and adaptations, and the same are intended to be comprehended within the meaning and range of equivalents of the appended claims.

We claim:

1. A force sensor comprising:
   a multilayered sensor body including a substrate layer having a recess formed in a surface thereof and a further layer disposed on said surface of the substrate layer and over said recess to form a measuring diaphragm adapted to undergo a deflection in response to a force applied thereto;
   means operatively coupled to the measuring diaphragm to sense deflection thereof; and,
   a test deflection device, separate from said sensing means and operatively coupled to the measuring diaphragm, for effecting a test deflection of the measuring diaphragm independently of any force external to the force sensor being applied to the measuring diaphragm, with the test deflection device being a piezoelectric actuator having a predetermined voltage-force characteristic.

2. The force sensor according to claim 1 wherein the test deflection device is structurally integrated into the measuring diaphragm.

3. The force sensor according to claim 1, wherein the test deflection device is disposed on a side of the measuring diaphragm facing away from a location on the force sensor for an application of a force to be sensed.

4. A force sensor comprising:
   a multilayered sensor body including a substrate layer having a recess formed in a surface thereof and a further layer disposed on said surface of the substrate layer and over said recess to form a measuring diaphragm adapted to undergo a deflection in response to a force applied thereto;
   means operatively coupled to the measuring diaphragm to sense deflection thereof; and,
   a test deflection device, separate from said sensing means and operatively coupled to the measuring diaphragm, for effecting a test deflection thereof independently of any force external to the force sensor being applied to the measuring diaphragm, with the test deflection device comprising a piezoelectric tape diaphragm having a predetermined voltage-force characteristic.

5. The force sensor according to claim 4, wherein the piezoelectric tape diaphragm forms said further layer, whereby the piezoelectric tape diaphragm simultaneously forms the measuring diaphragm.

6. The force sensor according to claim 1, wherein the means for sensing comprises a capacitive device operatively coupled to the measuring diaphragm.

7. The force sensor according to claim 1, wherein the means for sensing comprises a piezoelectric sensor operatively coupled to the measuring diaphragm.

8. The force sensor according to claim 1, wherein the test deflection device is disposed on the substrate layer.

9. The force sensor according to claim 1, wherein the measuring diaphragm and the test deflection device are integrated into the sensor body.

10. The force sensor according to claim 1, wherein the means for sensing comprises a piezoresistive sensor operatively coupled to the measuring diaphragm.

11. A force sensor comprising:

a multilayered sensor body including a substrate layer having a plurality of recesses formed in a surface thereof and a further layer disposed on said surface of the substrate layer and over said plurality of recesses to form a plurality of measuring diaphragms each adapted to undergo a deflection in response to a force applied thereto;

a respective sensing means operatively coupled to each of the measuring diaphragms for sensing deflections of the respective measuring diaphragm; and, a plurality of test deflection devices, which are separate from the sensing means and are each operatively coupled to a respective one of the measuring diaphragms and each comprised of a piezoelectric actuator, for effecting a test deflection of the respective measuring diaphragm independently of any force external to the force sensor being applied to the respective measuring diaphragm.

12. The force sensor according to claim 10, wherein each of the means for sensing comprises a piezoresistive sensor operatively coupled to the respective measuring diaphragm.

* * * * *